United States Patent
Mahmoud et al.

(10) Patent No.: US 12,018,637 B2
(45) Date of Patent: Jun. 25, 2024

(54) WIND TURBINE ROTOR BLADE

(71) Applicant: Wobben Properties GmbH, Aurich (DE)

(72) Inventors: Muhanad Mahmoud, Aurich (DE); Hussam Daboul, Südbrookmerland (DE); Ralf Messing, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/944,659

(22) Filed: Sep. 14, 2022

(65) Prior Publication Data
US 2023/0085398 A1  Mar. 16, 2023

(30) Foreign Application Priority Data
Sep. 16, 2021 (DE) .......................... 102021123954.0

(51) Int. Cl.
*F03D 1/06* (2006.01)
*F03D 80/40* (2016.01)

(52) U.S. Cl.
CPC ........... *F03D 1/0633* (2013.01); *F03D 80/40* (2016.05); *F05B 2240/2212* (2013.01); *F05B 2240/30* (2013.01)

(58) Field of Classification Search
CPC ...... F03D 1/0633; F03D 1/0675; F03D 80/40; F03D 80/60; F01D 5/187
See application file for complete search history.

(56) References Cited

U.S. PATENT DOCUMENTS

| | | | | |
|---|---|---|---|---|
| 9,169,830 | B2 * | 10/2015 | Weitkamp | ............. F03D 1/0675 |
| 9,518,468 | B2 * | 12/2016 | Tibbott | ................... F01D 5/20 |
| 10,458,253 | B2 * | 10/2019 | Mongillo, Jr. | .......... F01D 5/187 |
| 10,458,396 | B2 * | 10/2019 | Philipsen | ................ F03D 80/40 |
| 10,655,608 | B2 | 5/2020 | Pawis et al. | |
| 10,718,219 | B2 * | 7/2020 | Meier | ..................... F01D 5/186 |
| 11,125,091 | B2 * | 9/2021 | Zaccardi | ................. F01D 5/188 |
| 11,274,659 | B2 | 3/2022 | Godenau et al. | |
| 2015/0056074 | A1 * | 2/2015 | Veldkamp | ............... F03D 80/40 |
| | | | | 416/1 |
| 2016/0040654 | A1 | 2/2016 | Cuoghi et al. | |
| 2018/0216603 | A1 * | 8/2018 | Pawis | ................... F03D 1/0633 |
| 2020/0024968 | A1 * | 1/2020 | Meier | ..................... F01D 5/186 |
| 2020/0088172 | A1 | 3/2020 | Scholte-Wassink | |

FOREIGN PATENT DOCUMENTS

| | | |
|---|---|---|
| DE | 20014238 U1 | 6/2001 |
| DE | 102010051292 B4 | 5/2012 |
| DE | 102010051293 A1 | 5/2012 |
| DE | 102010051297 B4 | 4/2017 |
| WO | WO 2014202164 A1 | 12/2014 |
| WO | WO 2017021350 A1 | 2/2017 |
| WO | WO 2018211055 A1 | 11/2018 |

* cited by examiner

*Primary Examiner* — Sang K Kim
(74) *Attorney, Agent, or Firm* — Seed IP Law Group LLP

(57) ABSTRACT

A wind turbine rotor blade is provided comprising a rotor blade root region, a rotor blade tip region, a pressure side, a suction side, a front edge, a rear edge and at least one web along a longitudinal direction of the rotor blade. Furthermore, a deflecting unit is provided comprising at least two deflecting bends between one end of the at least one web and the rotor blade tip region.

6 Claims, 4 Drawing Sheets

WIND TURBINE ROTOR BLADE

BACKGROUND

Technical Field

The present invention relates to a wind turbine rotor blade and a wind turbine with a corresponding rotor blade.

Description of the Related Art

Since the rotor blades of a wind turbine are exposed to all weather conditions unprotected, icing of the rotor blades can occur at certain temperatures. In order to prevent this, a rotor blade heating system can be used. In this case, either a heater can be provided externally on the rotor blade or heated air can be provided inside the rotor blade.

WO 2017/021350 A1 discloses a wind turbine rotor blade having a rotor blade root region and a rotor blade tip region as well as a rotor blade heater. Further, at least one fin is provided along a longitudinal direction of the rotor blade. A deflecting unit in the form of a fin droplet can be provided on the fin in order to reduce turbulence of the air during deflection.

WO 2018/211055 discloses a rotor blade of a wind turbine of a rotor blade heating system with a rotor blade which has a flange and a deflecting unit on the rotor blade tip for deflecting heated air.

BRIEF SUMMARY

The present invention provides a wind turbine rotor blade which enables an improved heating of the rotor blade.

A wind turbine rotor blade is provided comprising a rotor blade root region, a rotor blade tip region, a pressure side, a suction side, a leading edge, a trailing edge and comprising at least one web between the pressure side and the suction side and along a longitudinal direction of the rotor blade. Furthermore, a deflecting unit is provided comprising at least two deflecting bends in or at a flow obstacle of an air guide.

By means of the deflecting unit with the multiple deflecting bend, a significant reduction of pressure losses can be achieved with a change in direction or a junctioning of the air flow. A reduction of the pressure loss by 20% can be achieved compared to a hitherto known deflecting unit with a deflecting bend.

According to one aspect, the deflecting unit according to an embodiment of the invention can also be used with a junction for an air flow inside the rotor blade. Here also a considerable reduction of the pressure loss can be achieved due to the configuration of the deflecting unit. Thus, the volume flow for the heating of the rotor blade can be increased for the same fan power.

According to one aspect, the air guide comprises at least one web which extends between the pressure side and the suction side along a longitudinal direction of the rotor blade. A deflecting unit (comprising the at least two deflecting bends) is provided between one end of the at least one web and, for example, the rotor blade tip region or a further web and is configured to deflect heated air which flows from the rotor blade root region along the at least one web.

According to one further aspect, the air guide comprises a junction. A deflecting unit is provided at the junction and serves to reduce the pressure losses in the region of the junction.

A flow obstacle in the air guide can be a junction of the air guide or an end of the region of the air guide (e.g., an end of the web) where a deflection of the air flow is required.

Furthermore, provided is a wind turbine comprising at least one wind turbine rotor blade described above and a rotor blade heating system.

According to one aspect, warm or heated air (which is produced by the rotor blade heating system) can be introduced or can flow into the rotor blade root region for heating the rotor blade. The heated air can then flow through an air guide along the length of the rotor blade. The air guide can be provided in the region between the leading edge and a first web so that the heated air flows along the leading edge and the web from the rotor blade root region in the direction of the rotor blade tip region. Alternatively to this, the heated air can flow into the region between the trailing edge and the other web from the rotor blade root region to the rotor blade tip region. A deflecting unit with at least two deflecting bends is provided on one of the webs.

Thus, a wind turbine rotor blade is provided comprising a rotor blade root region, a rotor blade tip region, a pressure side, a suction side and at least one web, which extends along a longitudinal direction of the rotor blade. In conventional rotor blades, the rotor blade tip is typically configured to be hollow but filled with a foam filler material. An effective heating of the rotor blade tip is thus impeded. This can result in ice formation in particular in the region of the rotor blade tip and can result in dangerous dropping of ice as a result of the high speed of the rotor blade tip. Furthermore, a heatable blade tip is provided with an adapted deflection in the rotor blade tip region. Furthermore, a web bulkhead can optionally be provided. For further improvement a bypass scoop can be provided in or on one of the webs which optimizes the flow in the deflection region in which the boundary layer flow is extracted at the web end and thus, flow separations and turbulence can be reduced.

A volume flow of the blade heating system can be increased without increasing the power of the fan. With the rotor blade according to an embodiment of the invention, it is possible to optimally deflect an air flow at each flow rate and reduce a pressure loss. With the rotor blade according to an embodiment of the invention, a flow separation and turbulence in the deflection region or in the region of the junction can be reduced. In particular, a dead air region which forms at that end of the web which is adjacent to the deflecting unit can be reduced. The rotor blade or the rotor blade tip can be de-iced in order to reduce dropping of ice.

With the rotor blade according to an embodiment of the invention, the air flow of a rotor blade heating system can be improved in a simple and uncomplicated manner without negatively influencing the lightning protection.

Additionally or alternatively a deflecting element can be provided which has the smallest possible change in cross-sectional area wherein the flow channel has a small change in cross-sectional area after installation of the deflecting unit.

A wind turbine rotor blade is provided which has at least one, preferably two, webs along the longitudinal direction of the rotor blade. For heating the rotor blade an air flow can be provided along the web. The air flow starts in the rotor blade root region and the preferably heated air flows along the first and/or second web and must be deflected. This is accomplished by a deflecting unit comprising at least two deflecting bends. The two deflecting bends each have a first and a second end with a central region in between. The central regions are configured as bends which each have a radius.

Optionally a hollow rotor blade tip can be provided, before which a further deflecting unit is provided which leaves free a first and a second air channel between the deflecting unit and the shells of the rotor blade so that the hollow rotor blade tip can be heated or can have warm air flowing therethrough.

BRIEF DESCRIPTION OF THE SEVERAL VIEWS OF THE DRAWINGS

Advantages and exemplary embodiments of the invention are explained in detail hereinafter with reference to the drawings.

DETAILED DESCRIPTION

Figure 1:
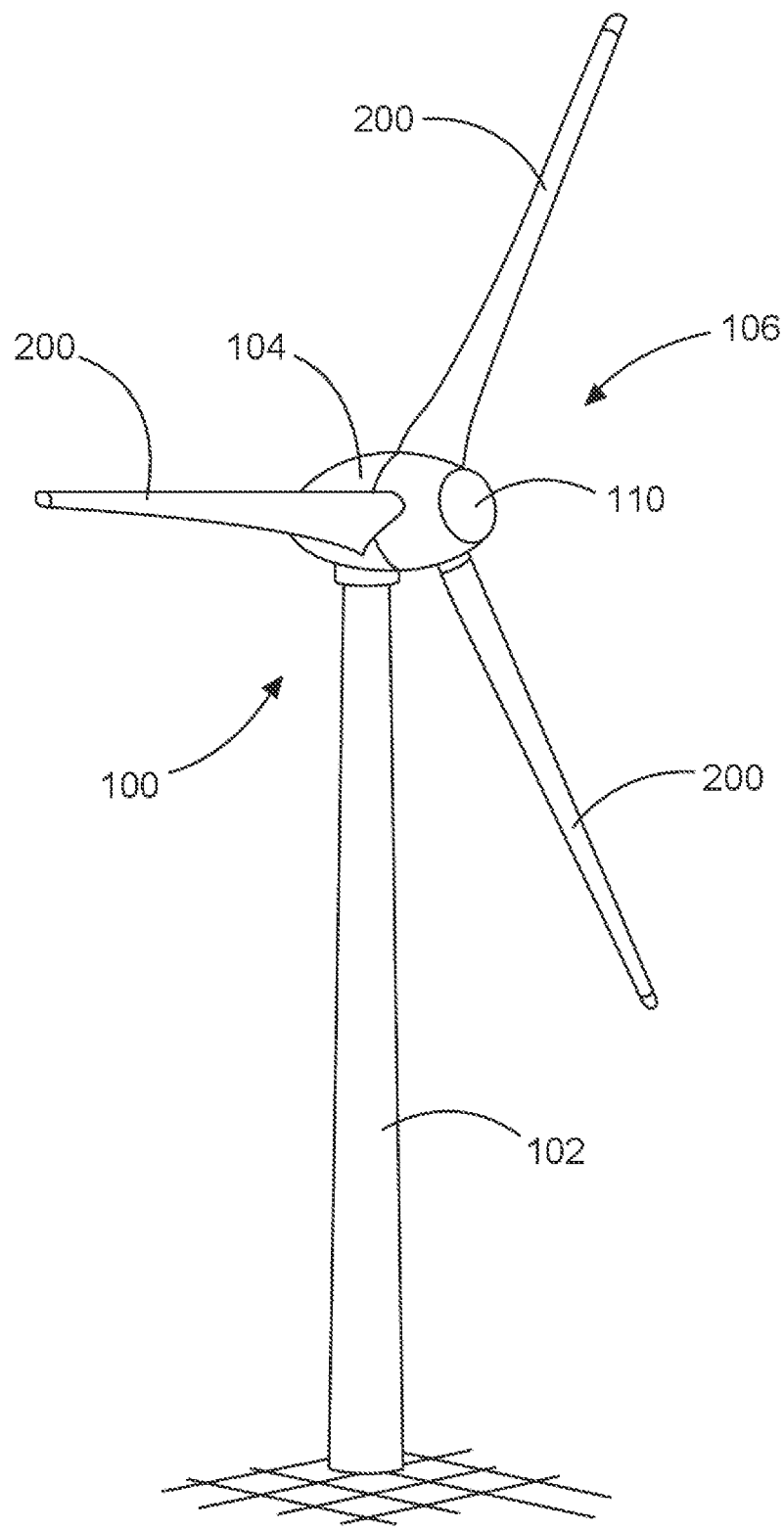
FIG. 1 shows a schematic diagram of a wind turbine according to the invention.

FIG. 1 shows a schematic diagram of a wind turbine according to the invention. The wind turbine 100 comprises a tower 102 and a nacelle 104 on the tower 102. An aerodynamic rotor 106 with three rotor blades 200 and a spinner 110 is provided on the nacelle 104. During operation of the wind turbine the aerodynamic rotor 106 is set in a rotary motion by the wind and therefore also rotates a rotor or armature of a generator which is coupled directly or indirectly to the aerodynamic rotor 106. The electric generator is arranged in the nacelle 104 and generates electrical energy. The pitch angle of the rotor blades 200 can be changed by pitch motors on the rotor blade roots of the receptive rotor blades 200.

Figure 2:
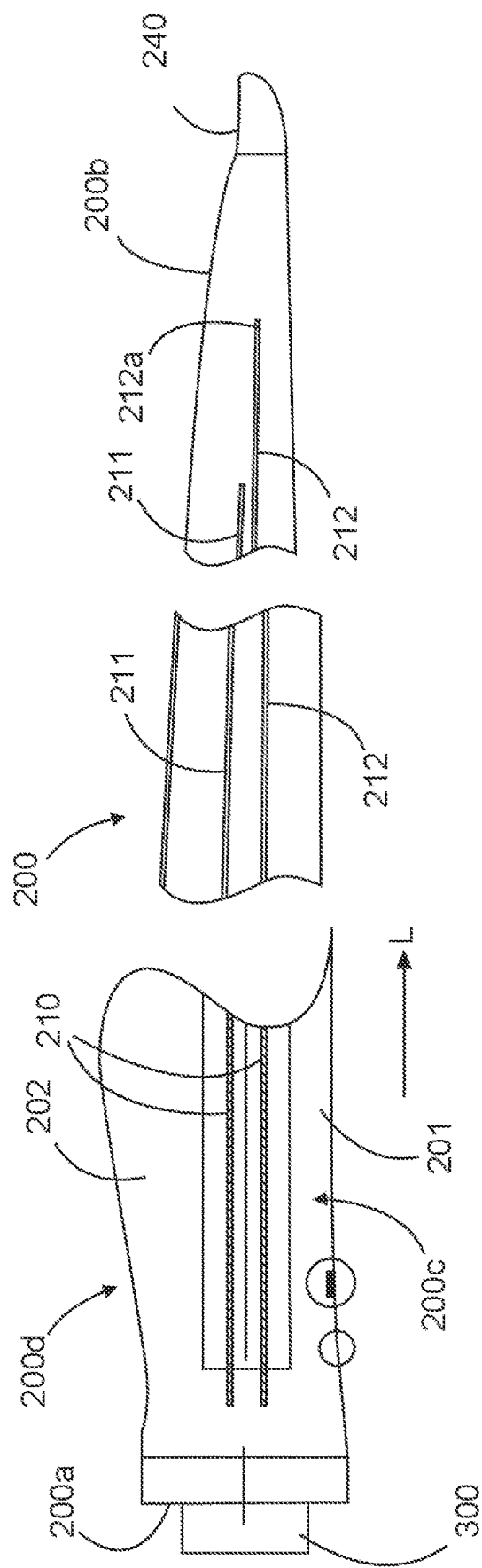
FIG. 2 shows a schematic and sectional view of a rotor blade of the wind turbine from FIG. 1.

FIG. 2 shows a schematic and sectional view of a rotor blade of the wind turbine from FIG. 1. The rotor blade 200 comprises a rotor blade root region 200a, a rotor blade tip region 200b, a rotor blade tip 240, a leading edge 201, a trailing edge 202, a pressure side 200c and a suction side 200d. An air guide is provided inside the rotor blade 200 which comprises at least one flow obstacle. A rotor blade heating system 300 can be provided in the region of the rotor blade root region 200. The rotor blade heating system 300 comprises at least one air filter and generates warm air which is guided inside the rotor blade.

At least one web 210 extends inside the rotor blade along a longitudinal direction L of the rotor blade 200 which web is part of the air guide or which is already present for other reasons and the air guidance is merely a secondary function. For example, two webs 211, 212 can be provided which can be configured to run initially parallel and optionally towards one another in the region of the rotor blade tip 240. In this case, the length of the first web 211 can be less than the length of the second web 212. The rotor blade tip 240 can optionally be configured as a separate part and be fastened to the remainder of the rotor blade 200.

Air heated by the rotor blade heating system can be guided along the webs—as part of the air guide—in the direction of the rotor blade tip 240 and then deflected. Optionally, the rotor blade tip 240 can be at least partially configured to be hollow so that a part of the heated air can flow through the rotor blade tip 240 in order to de-ice the rotor blade tip 240.

According to one aspect, the heated air can be produced by means of the rotor blade heating system 300 either in the rotor blade root region in which air is heated by means of a heating unit 300 or the heated air is supplied to the rotor blade 200 in the rotor blade root region 200a.

According to one aspect, the air guide can have a junction 213 (see FIG. 3) in order, for example, to be able to supply different sections within the rotor blade with heated air. A deflecting unit 250 comprising at least two deflecting bends is provided in the region of the junction so that heated air which is to be junctioned off by means of the junction also flows through the deflecting unit and is thus deflected.

Figure 3:
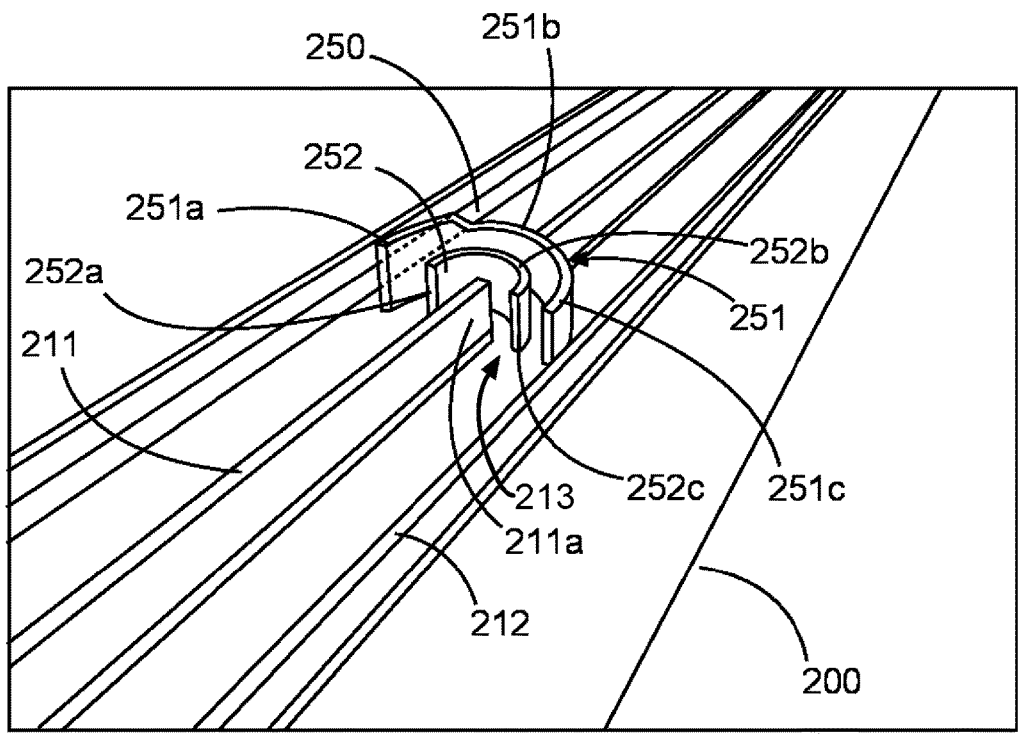
FIG. 3 shows a schematic diagram of a section of a rotor blade according to an embodiment of the invention.

FIG. 3 shows a schematic diagram of a section of the rotor blade according to an embodiment of the invention. The rotor blade 200 has two webs 211, 212 which can run, as shown in FIG. 2 for example. A deflector or deflecting unit 250 is provided at the first web 211 or alternatively on the second web 212. The deflecting unit 250 should serve to deflect heated air which flows between a leading edge and the first web 211, between the first and second web 211, 212 or between the second web 212 and the trailing edge from the rotor blade root in the direction of the rotor blade tip. The heated air can be produced by the rotor blade heating system 300 in the region of the rotor blade root.

Whereas in the prior art only one deflecting bend is provided, the deflecting unit 250 has at least two deflecting bends 251, 252. Here the first deflecting bend 251 can have a larger radius than the second deflecting bend 252. A free space is provided between an end 211a of the first web 211 and the second deflecting bend 252 so that warm air can be deflected by the second deflecting bend 252. The first deflecting bend 251 which has a larger radius than the second deflecting bend 252 is provided at a distance from the second deflecting bend 252. As can be seen in FIG. 3, the first deflecting bend 251 has a first end 251a, an arc section 251b and a second end 251c. The first end 251a projects into a region between the leading edge 201 and the first web 211. The second end 251 projects into the region between the first and second web 211, 212. Optionally the first end 251a of the first deflecting bend 251 can have an extension so that the first end 251a of the first deflecting bend 251 at least partially adjoins a wall of the leading edge 201. The second deflecting bend 252 has a first and second end 252a, 252c and an arc section 252b in between.

Figure 4:
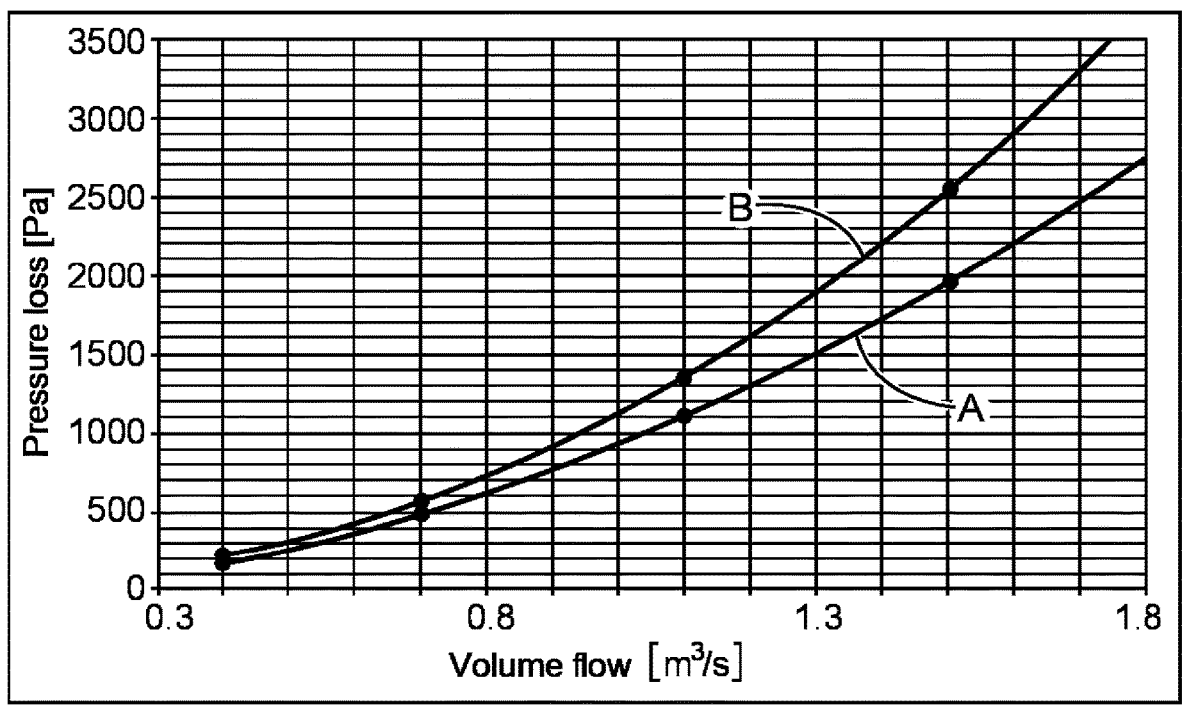
FIG. 4 shows a graph to illustrate the dependence of the pressure loss of the deflecting unit on the volume flow.

FIG. 4 shows a graph to illustrate the dependence of the pressure loss of the deflecting unit on the volume flow. In FIG. 4, the pressure loss A is plotted as a function of the volume flow for the deflecting unit 250 with the first and second deflecting bends. Furthermore, the pressure loss B is plotted for a deflecting unit with only one deflecting bend. It therefore follows from FIG. 4 that the pressure loss caused by the deflecting unit according to the invention can be reduced appreciably compared to the prior art.

Figure 5A:
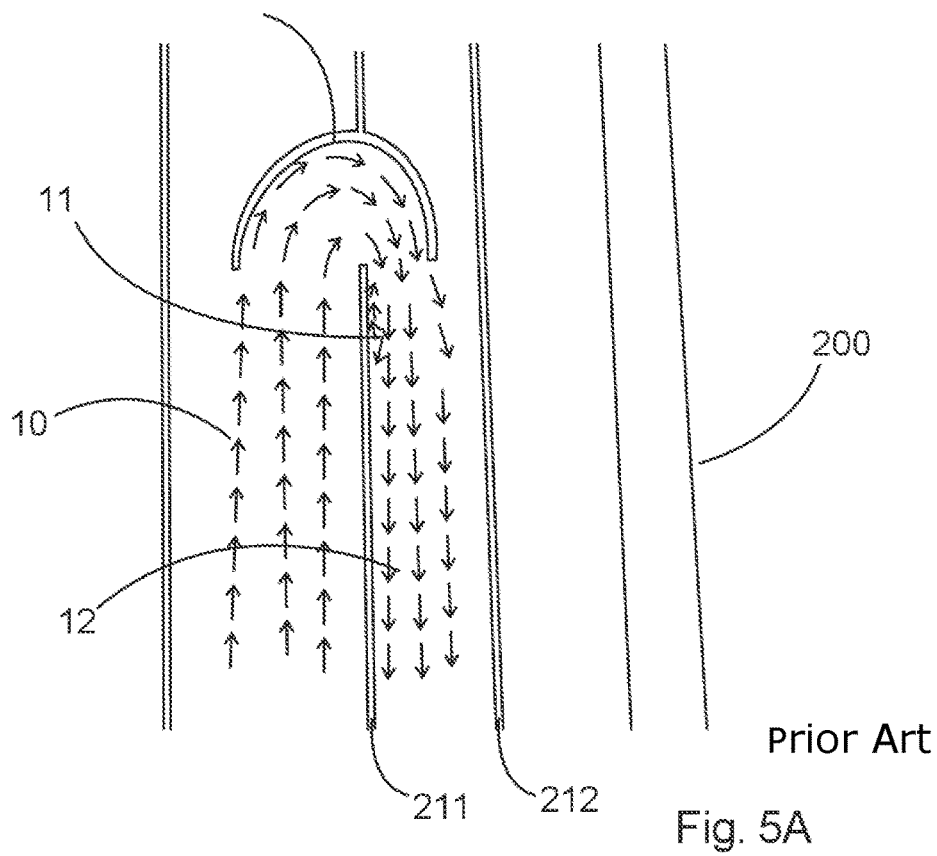
FIG. 5A shows a schematic illustration of a pressure loss in a deflecting unit in the prior art.
Figure 5B:
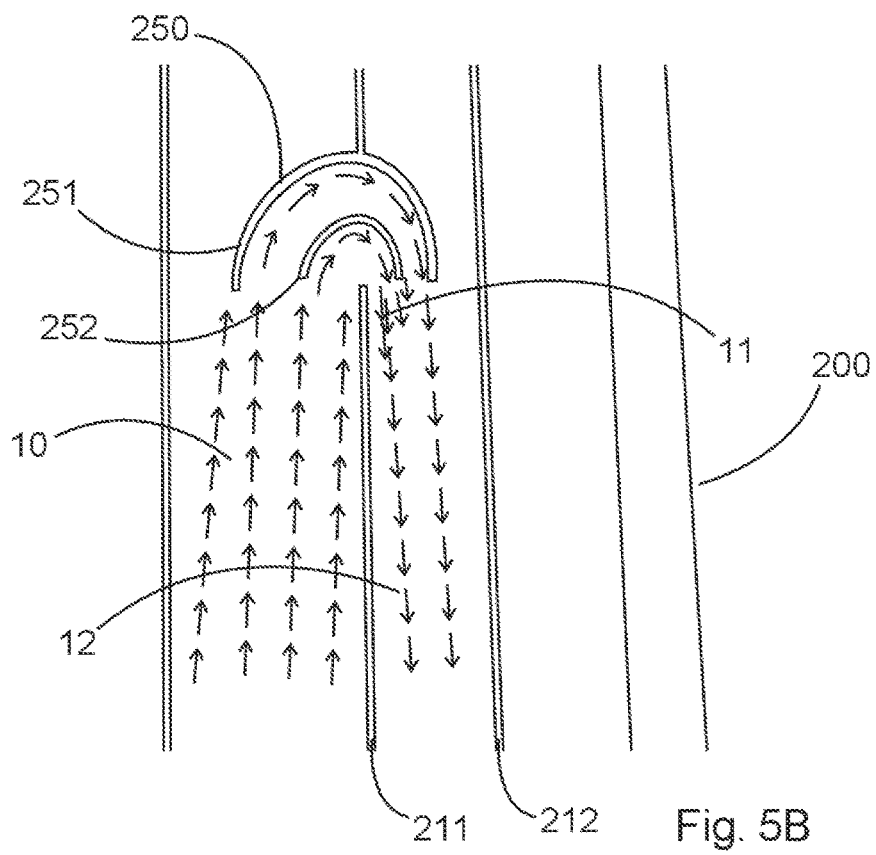
FIG. 5B shows a rotor blade according to an embodiment of the invention.

FIGS. 5A and 5B show a schematic illustration of a pressure loss in a deflecting unit in a rotor blade according to the prior art and according to an embodiment of the invention, respectively. FIG. 5A shows a section of a rotor blade 200 with a deflecting unit 249 having a single deflecting bend. FIG. 5B shows a section of the rotor blade 200 with a deflecting unit 250 according to an embodiment of the invention which comprises a first and second deflecting bends 251, 252. As can be seen from FIG. 5A, heated air 10 flows along the first web 211 and impinges upon the deflecting unit 249 where it is deflected into a region between the first and second web 211, 212. Here however, a dead air region 11 is formed at the end of the web 211.

As can be seen in FIG. 5B, the deflecting unit according to an embodiment of the invention with the at least two deflecting bends 251, 252 brings about a considerable reduction of the dead air region 11. This leads to the reduction of the pressure loss by the deflecting unit shown in FIG. 4. Thus, the heating of the rotor blade according to the invention can be improved appreciably.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind turbine rotor blade, comprising:
    a blade body having:
        a rotor blade root region,
        a rotor blade tip region,
        a pressure side,
        a suction side,
        a leading edge,
        a trailing edge,
    an air guide for guiding heated air inside the blade body, the air guide including end portions and a main portion between the end portions, wherein the air guide includes an opening in the main portion, and
    a plurality of deflectors arranged offset with respect to one another and in the opening of the air guide, wherein the plurality of deflectors includes a first deflector and a second deflector,
    wherein the first deflector includes a first deflecting bend and the second deflector includes a second defecting bend, wherein the first deflecting bend has a larger radius than the second deflecting bend, and wherein the at least first and second deflecting bends both serve to deflect air flowing along the air guide.

2. The wind turbine rotor blade according to claim 1, wherein the air guide comprises a web arranged between the pressure side and the suction side and extends along a longitudinal direction of the rotor blade, wherein the at least first and second deflecting bends both serve to deflect air flowing along the web.

3. The wind turbine rotor blade according to claim 2, wherein the plurality of deflectors are located between an end of the web and the rotor blade tip region.

4. The wind turbine rotor blade according to claim 3, wherein the first and second deflector bends are in a shape of semi-circular curves.

5. The wind turbine rotor blade according to claim 1, wherein the first deflecting bend and the second deflector are overlapping each other.

6. A wind turbine, comprising:
    at least one wind turbine rotor blade according to claim 1, and
    at least one rotor blade heater for providing heated air to the at least one wind turbine rotor blade.

\* \* \* \* \*